United States Patent
Johansen et al.

(10) Patent No.: US 7,164,479 B2
(45) Date of Patent: Jan. 16, 2007

(54) OPTICAL DISPLACEMENT SENSOR

(75) Inventors: Ib-Rune Johansen, Oslo (NO); Britta Grennberg Fismen, Oslo (NO); Henrik Rogne, Oslo (NO); Dag Wang, Oslo (NO); Berit Sundby Avset, Oslo (NO); Alain Ferber, Haslum (NO); Ralph W. Bernstein, Bekkestua (NO)

(73) Assignee: Sinvent AS, Trondheim (NO)

( * ) Notice: Subject to any disclaimer, the term of this patent is extended or adjusted under 35 U.S.C. 154(b) by 280 days.

(21) Appl. No.: 10/497,099

(22) PCT Filed: Oct. 2, 2002

(86) PCT No.: PCT/NO02/00355

§ 371 (c)(1),
(2), (4) Date: May 28, 2004

(87) PCT Pub. No.: WO03/046498

PCT Pub. Date: Jun. 5, 2003

(65) Prior Publication Data

US 2005/0105098 A1    May 19, 2005

(30) Foreign Application Priority Data

Nov. 29, 2001  (NO)  ................................ 20015825

(51) Int. Cl.
*G01B 11/02* (2006.01)
*G01B 9/02* (2006.01)

(52) U.S. Cl. ...................................... 356/506; 356/519

(58) Field of Classification Search ............... 356/35.5, 356/454, 506, 519
See application file for complete search history.

(56) References Cited

U.S. PATENT DOCUMENTS

| 4,983,824 | A | | 1/1991 | Saaski et al. |
| 5,128,537 | A | | 7/1992 | Hälg |
| 5,165,416 | A | * | 11/1992 | Shinoda et al. ............. 600/485 |
| 5,479,539 | A | * | 12/1995 | Goldsmith et al. ........... 385/14 |

(Continued)

FOREIGN PATENT DOCUMENTS

CH        681047 A5        12/1992

(Continued)

OTHER PUBLICATIONS

B. Grennberg Fismen et al., *A Novel Micro-Optical Microphone Based on the Fabry-Perot Principle*, SINTEF Electronics and Cybernetics, p. 1-4.

(Continued)

*Primary Examiner*—Gregory J. Toatley, Jr.
*Assistant Examiner*—Michael A. Lyons
(74) *Attorney, Agent, or Firm*—Rothwell, Figg, Ernst & Manbeck, P.C.

(57) ABSTRACT

This invention relates to an optical displacement sensor element, e.g. for use in a pressure sensor or a microphone, comprising two essentially flat surfaces being separated by a cavity being defined by a spacer, the distance between the surfaces being variable thus providing a displacement sensitive Fabry-Perot interferometer. Both of said surfaces are at least partially reflective, and in that said first surface is provided with at least one optical detector, and one of surfaces being provided on an at least partially transparent material.

12 Claims, 8 Drawing Sheets

U.S. PATENT DOCUMENTS 5,589,689 A    12/1996    Koskinen
5,909,280 A     6/1999    Zavracky

FOREIGN PATENT DOCUMENTS

EP    0 196 784 A2    10/1986
EP    0 571 107 A1    11/1993
GB    2 338 059 A     12/1999
WO    WO 87/02470 A1   4/1987

OTHER PUBLICATIONS

Photek, *Vacuum Compatible Detectors*, http://fp.photek.plus.com/vcd.htm, Apr. 25, 2002, p. 1-7.

* cited by examiner

Figure 1.

PRIOR ART

Figure 2.

PRIOR ART

OPTICAL DISPLACEMENT SENSOR

This invention relates to an optical displacement sensor element, e.g. for use in a pressure sensor or a microphone, comprising two flat surfaces being separated by a cavity defined by a spacer, the distance between the surfaces being variable depending on pressure fluctuation in the environment relative to the pressure in the cavity.

Until recently displacement sensors such as microphones has been based on capacitor structures and impedance measurements. This has a number of disadvantages related to sensitivity, high voltage biasing, isolation between layers, alignment and positioning of membrane relatively to back electrode, high requirements to preamplifiers, and non-linear response, all resulting in costly and complicated solutions.

Optical displacement sensors are able to solve many of the major problems that capacitive sensors are suffering from. There are no problems with biasing or need of electrical isolation. Interferometric sensors are able to achieve equal or better sensitivity than capacitive displacement sensors with less demanding electronics, but until now these solutions have been relatively expensive because the problem with alignment and positioning has not been solved.

Optical displacement sensors are described in a number of publications, such as Nikolai Bilaniuk: "Optical Microphone Transduction Techniques" in Applied Acoustics, vol. 50, No. 1, pp 35–63, 1997, Dennis S. Greywall: "Micromachined optical-interference microphone", in Sensors and Actuators 75 (1999 257–268, and David Keating: "Optical Microphones" in Microphone Engineering edited by Michael. Gayford, Oxford Boston Focal Press 1994. These publications describe a number of different types of optical microphones, and among these, solutions based on Fabry-Perot interferometers.

Other Fabry-Perot sensors are described in U.S. Pat. Nos. 5,909,280, 5,128,537 and international patent application WO 87/02470.

U.S. Pat. No. 5,909,280 describes a spectrometer comprising a detector integrated in a silicon substrate underneath one of the Fabry-Perot mirrors, while the second mirror is mounted on a spring structure. The distance between the mirrors are adjusted electrostatically. The light to be interrogated is provided through an optical waveguide.

U.S. Pat. No. 5,128,537 and WO 87/02470 shows Fabry-Perots, pressure sensor and interferometers, respectively, with external detectors and light sources.

CH 681,047 A5 describes a measuring system, especially for pressure measurements, comprising two Fabry-Perot interferometers of which the first is coupled to a cavity in which the pressure is to be measured, as well as a light source and an optical fibre for transferring the output from first to the second Fabry-Perot interferometer. The reflecting surfaces in the second interferometer being positioned in a transparent material and a silicon material, respectively, said silicon material also being provided with a detector. This is a complicated and thus fairly expensive solution. Also, as the optical wave fronts transferred from the optical fibre will be spherical, interference will arise on the detector surface limiting the sensitivity. It is an additional object of this invention to provide a simple and cost efficient solution having high sensitivity.

Microphones based on Fabry-Perot interferometers are in general difficult to align, as optics must be aligned correctly relative to the interferometer, and the two surfaces forming the Fabry-Perot cavity must be parallel relative to each other. This problem is mentioned in Keating's article but only as a minor problem, as other problems related to other microphone types are deemed to be more difficult to handle than the problems related to the Fabry-Perot interferometer.

The need for high precision alignment of the cavity reduces the possibilities for making low-cost microphones which are able to compete with ordinary microphones.

The alignment problems are used as an advantageous feature in the microphone described in U.S. Pat. No. 6,055,080. This solution is, however, still a complicated and expensive solution. It is an object of this invention to provide a optical sensor element and device which reduces the above mentioned alignment problems by implementing the detector in one of the Fabry-Perot surfaces in addition to exploiting the inherent alignment of the wafer bonding process.

It is also an object of this invention to improve the solution disclosed in the above mentioned article by providing an optical sensor element for measurement of pressure fluctuations, acoustic signals or the like without requiring individual alignment of optics or complicated electronic circuits. It is also easy to manufacture in large quantities without need for costly precision alignments of any optical parts.

These objects are obtained with a sensor element and device as described above being wherein both of said surfaces are at least partially reflective, and said first surface being provided with at least one optical detector, and said second surface being provided on an at least partially transparent material, the sensor also comprising an essentially monochromatic and essentially point shaped light source directed toward said parts and means for providing inphase addition of the emitted light on the surface of said at least one detector.

The phrase "inphase addition" here refers to interference on the surface of the sensor either provided by collimating an essentially coherent wavefront so as to cause any level of constructive or destructive interference on the whole detector surface, or by providing a ring shaped detector. A point shaped source emitting essentially coherent, spherical wavefronts will result in a circular interference pattern the detector, thus inphase addition on the detectors is provided by number of concentric ring shaped detectors.

More specific, the invention is characterized as presented in the accompanying independent claims.

The invention will be described in more detail below, referring to the accompanying drawings illustrating the invention by way of example. It is further characterised as stated in the accompanying claims.

Figure 1:
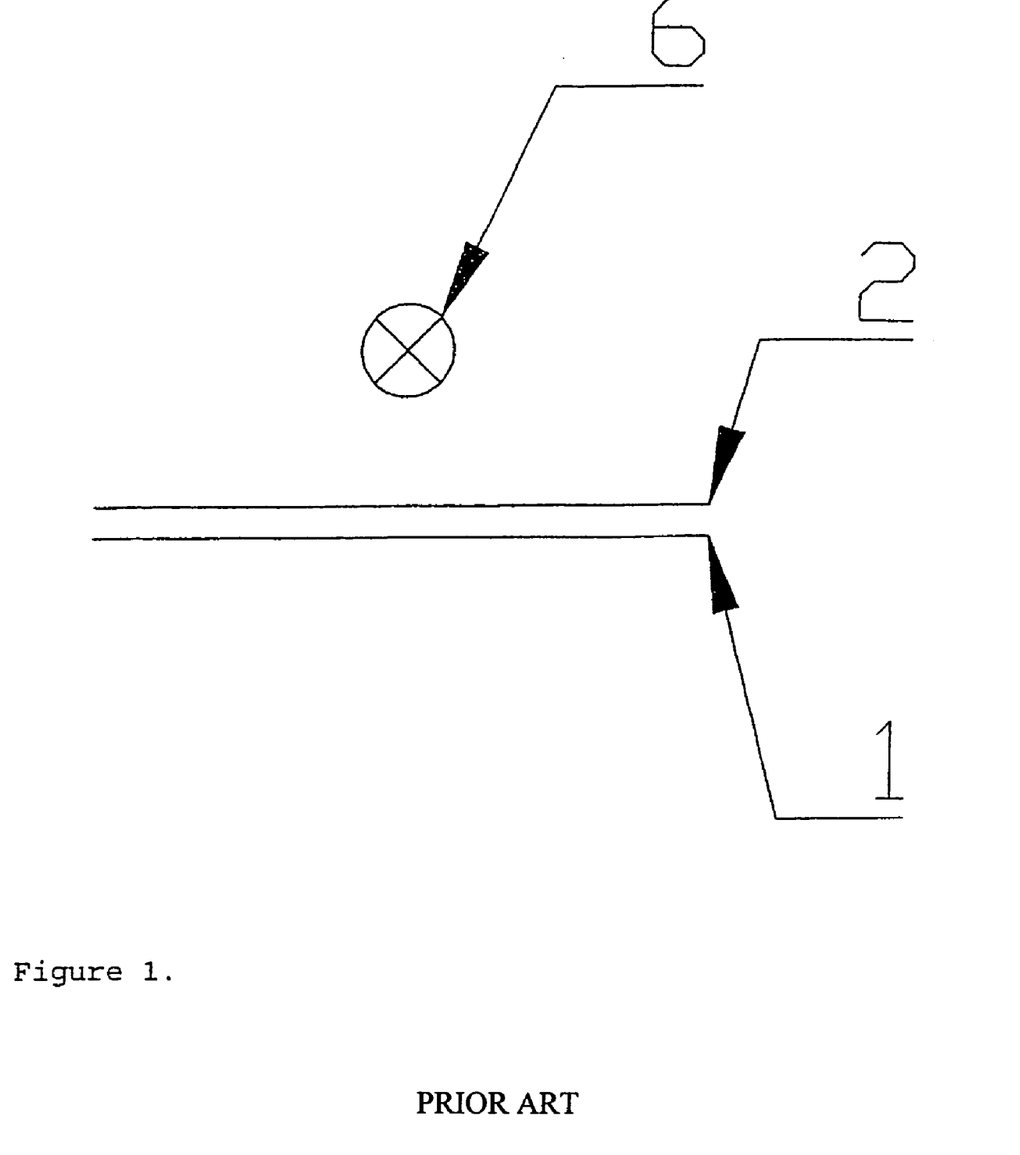
FIG. 1 illustrates a simplified Fabry-Perot interferometer

The Fabry-Perot interferometer's elements are illustrated in FIG. 1. It comprises two flat parallel surfaces (1 and 2), often coated to obtain a chosen reflectivity, separated by a spacer distance d to form a cavity. A sufficiently monochrome and coherent collimated light source (6) is directed towards the cavity, and the transmitted light through the cavity is collected by a detector (not shown). When the cavity distance varies, the transmitted light intensity varies due to constructive and destructive interference between the cavity surfaces. The intensity on a detector positioned on the opposite side from the light source varies according to $$T = T\max/(1+(2F/\pi)^2 \sin^2(2\pi d/\lambda)) \qquad 1$$

where F is the interferometer's finesse, a measure of the reflectivity of the cavity surfaces, and λ is the optical wavelength (Born & Wolf "Principles of optics, electromagnetic theory of propagation, interference and diffraction of light"). If the finesse equals one (low reflectivity surfaces), the optimal cavity distance is $$d = \lambda/8 + m\lambda/4 + n\lambda; \; m,n = 0, 1, 2, \ldots \qquad 2$$

where the greatest linearity is obtained. If the finesse increases, the optimal distance is $$d = m\lambda/2 \pm \Delta;, \; m = 0, 1, 2, \ldots, \Delta \in 0 \ldots \lambda/8 \qquad 3$$

Figure 2:
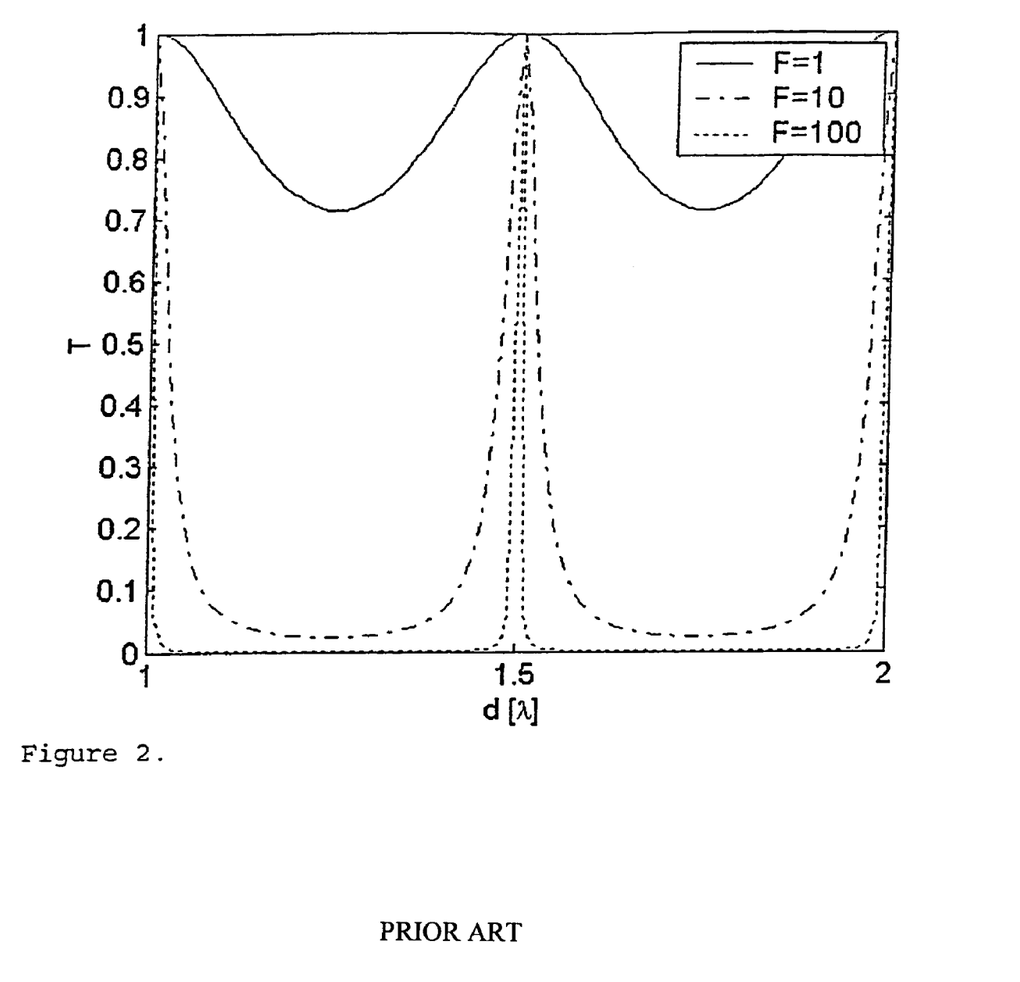
FIG. 2 illustrates the transmitted intensity T on the optical axis of the sensor for different values of the finesse F as a function of the cavity distance d.

Δ is close to or may be essentially equal to max(|∂(T)/∂(d)|) where T is the transmitted intensity as defined in equation 1 and d is the cavity distance. FIG. 2 shows the transmitted intensity as function of cavity distance in the range λ to 2λ, for finesse=1, 10 and 100.

Figure 3:
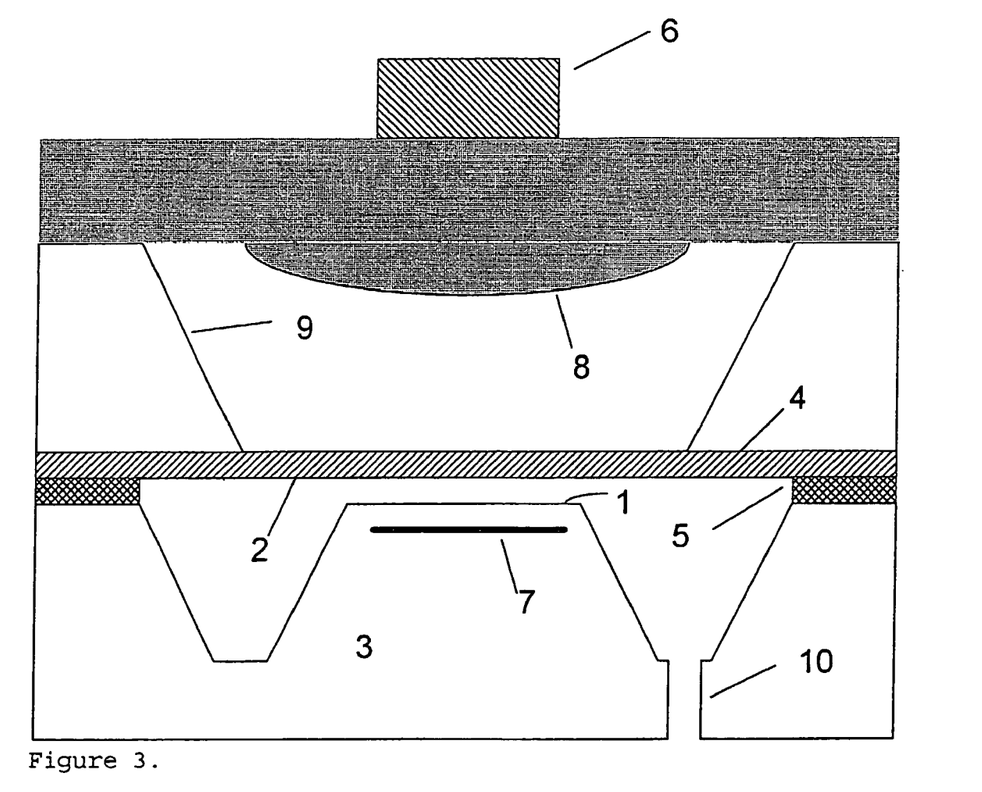
FIG. 3 illustrates the cross section of a sensor according to the invention.

The present invention is based on the Fabry-Perot interferometer and reduces the above mentioned alignment problems by implementing the detector in one of the Fabry-Perot surfaces in addition to exploiting the inherent alignment of the wafer bonding process. A preferred embodiment of the invention is illustrated in FIG. 3. The first sensor element part 3 is preferably made from silicon and pn junctions constitutes the detector or detectors 7. The techniques for making this type of detectors are well known and will not be described in any detail here. One or more holes 10 may be used to secure pressure equilibrium in applications like a microphone. The Fabry-Perot cavity's first surface 1 is the detector surface. The second surface 2 is made of a partially reflecting flexible and transparent material 4, for example silicon nitride, and is secured on a rigid frame 9, made of for example silicon.

According to a preferred embodiment of the invention the detector 7 is provided with a large surface area, thus reducing the need for exact alignment of the sensor.

A spacer 5 defines a cavity between the surfaces 1, 2 and separates the two element parts 3, 4. The spacer may be a separate part or be constituted by a part of the first or second element parts.

Also illustrated in FIG. 3 is a point shaped light source 6, e.g. a light emitting diode (LED) or a laser, and a lens 8, e.g. a moulded plastic lens, for collimating the light. The light source and the lens are fastened on the rigid frame 9 thus maintaining a predetermined distance between the lens and the Fabry-Perot interferometer. The light from the source 6 is collimated by the lens 8 to provide a plane wavefront through the Fabry-Perot to the detector. Thus the interference conditions will be essentially equal over the whole detector surface resulting in a measured intensity being a sum over the whole detector 7.

Figure 4:
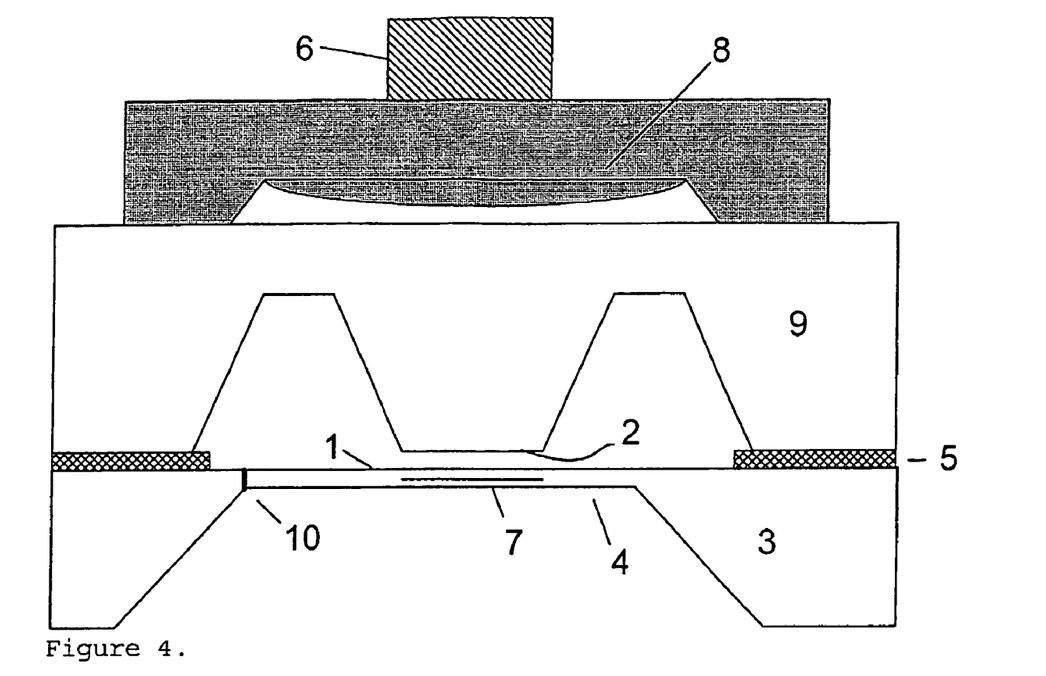
FIG. 4 illustrates an alternative embodiment of the sensor.

In another embodiment of the invention, illustrated in FIG. 4, the pn junction 7 is implemented in the membrane itself 4. The lower element part 3 may be made of silicon and the detector may be integrated in a thin silicon membrane. The upper element part 9 is made of a transmitting material e.g. pyrex, and the partly reflecting and transmitting surface 2 may be coated to obtain higher reflectivity.

According to another embodiment of the invention the detector is positioned on the transparent element part, e.g. by making the transparent part and detector sufficiently thin, thus allowing the reflective surface to be positioned on a nontransparent material.

Figure 5:
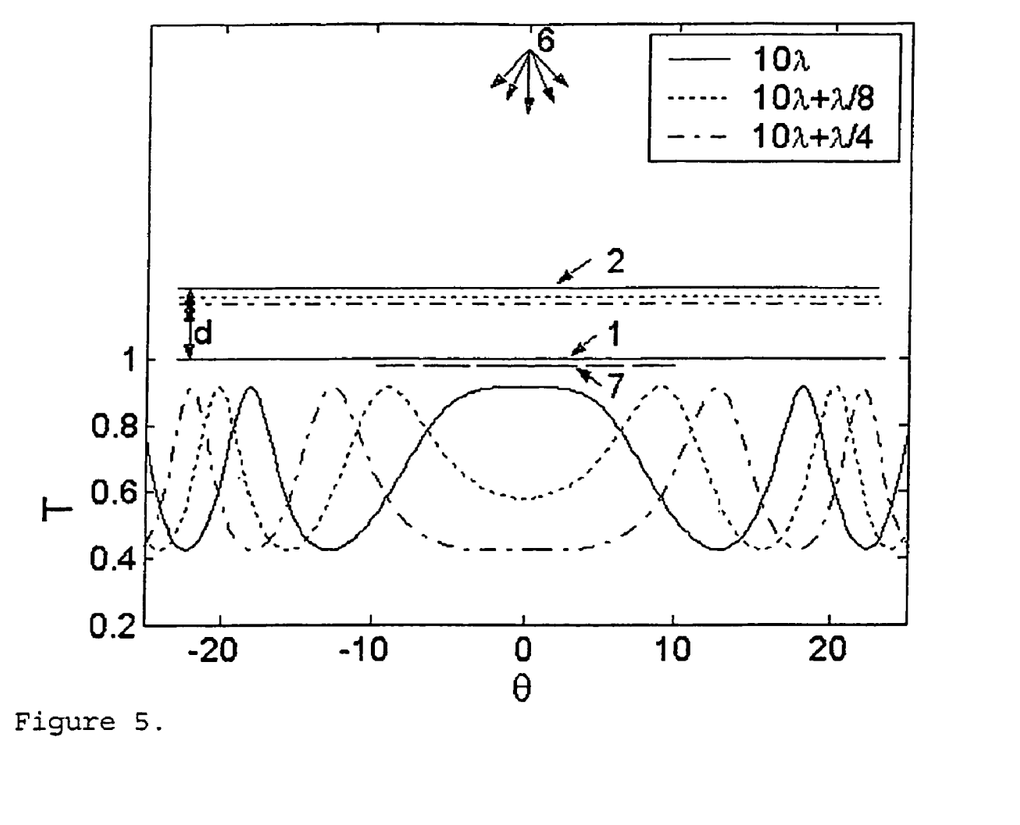
FIG. 5 illustrates schematically another alternative embodiment of the sensor together with the calculated transmitted intensity T for three different cavity distances ($10\lambda$, $10\lambda+\lambda/8$, $10\lambda+\lambda/4$) as function of angle of incidence $\theta$.

Yet another embodiment of the invention is schematically illustrated in FIG. 5, where an uncollimated (divergent) light source is used instead of a collimated light source. This eliminates the need for collimating optics. The light from this source transmitted through the Fabry-Perot interferometer will form a ring pattern described by the Airy function. The width of the Airy-pattern depends on the distance between the reflecting surfaces, the distance to, the slight source and the wavelength of the light.

As the cavity distance is varied, the intensity distribution over the pattern varies. At a light incidence angle θ from the optical axis the cavity distance seen by the transmitted light corresponds to $$d' = d/\cos\theta \qquad 4$$

The transmitted intensity is a periodic function of cavity distance d, with period λ/2. By implementing a ring detector in surface 1 with several rings the sensor becomes less sensitive to the spacer thickness, as a good signal contrast is measured on at least one of the detector rings. An example of a ring detector is AME's AE9430. If we divide the detector into sufficiently thin rings, we will always manage to cover a cavity distance where the intensity varies linearly (for F=1 this corresponds to a d as in 2). The ring structure should cover an angle span of 0 . . . θ, where θ is defined as $$\cos\theta = d/(d+\lambda/4) \qquad 5$$

Figure 6:
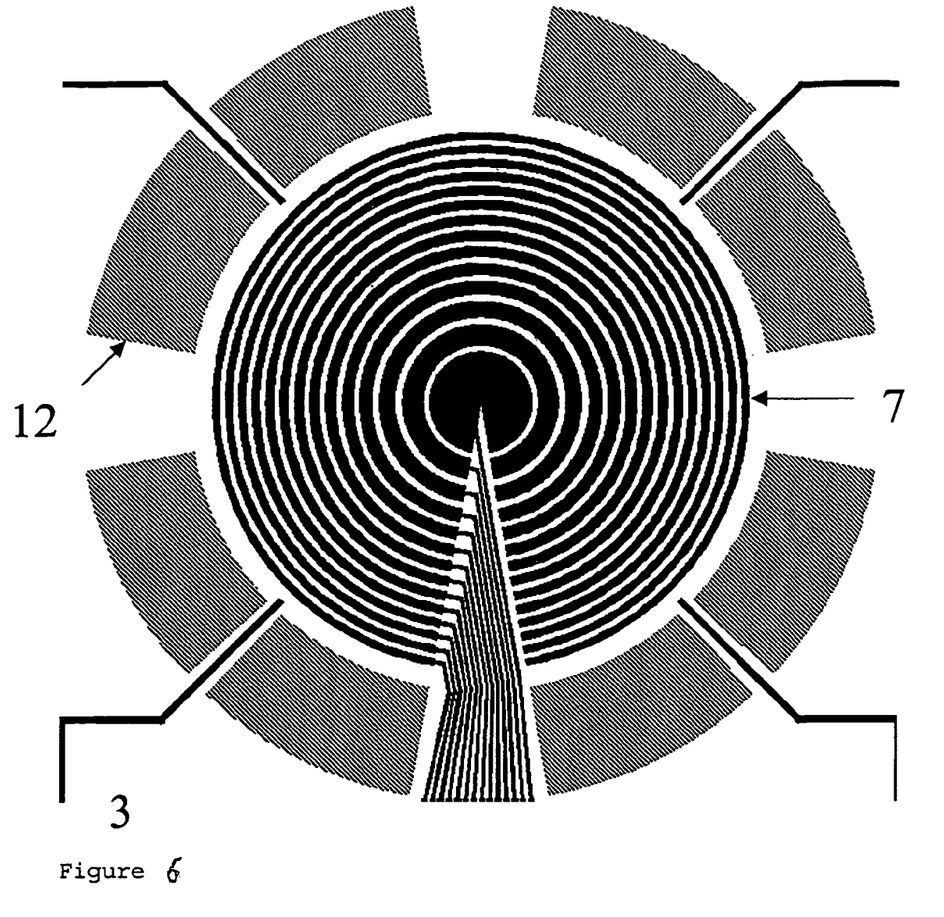
FIG. 6 illustrates an example of a detector being constituted by a number of concentric detector rings.

With a cavity distance d=10λ=>θ=12.7°. With a detector radius of 1 mm; this corresponds to a source distance of $$\tan(a\cos(d/(d+\lambda/4))) = r/(d+h) \qquad 6$$

where r is detector radius and h is the distance between the cavity surface 2 and light source 6 (see FIGS. 1 and 5). This is a source distance of 4.4 mm (the cavity distance d is neglected). The rings should not cover an angle span of more than λ/16, for keeping the linearity. With such a ring detector the sensor performance becomes far less sensitive to the cavity distance. An example of a ring detector structure is shown in FIG. 6, wherein the total area of each ring is substantially the same.

This source and detector structure also makes it possible to do differential measurements, thus eliminating the drift in the light source. If we on two different rings record a linearly varying signal with respect to the membrane displacement Δ as described earlier, these signals can be used to compensate for drift in the light source according to $$\frac{signal1 - signal2}{signal1 + signal2} \sim \Delta \qquad 7$$

According to one embodiment of the invention being relatively independent of the choice of light source a relatively large number of thin rings is used in order to be flexible on choice of light source and cavity distance.

Signals from two or several rings can be summed if necessary. In some cases, e.g. when testing with collimated light, all signals can be added and the ring detector works as one single detector. In another embodiment of the invention, the area of each ring is kept constant, in order to achieve equal maximum obtainable optical intensity on each detector.

FIG. 5 illustrates how the interference pattern changes as a function of angle with three spacers of different thickness. With each spacer there are a number of optimal angle of incidence on the detector corresponding to a modified cavity distance d' as in FIG. 5.

A practical embodiment of this sensor may have the following dimensions if used as a pressure sensor or microphone: The Fabry-Perot cavity is modelled with a semi-infinite layer of air (n=1), a 0.5 μm thick layer of silicon nitride (n=2), an air gap (of varying thickness around 10λ) and a semi-infinite layer of Si (n=3.68). The Fresnel formulas are used for calculating the transmitted light intensity (see for example Born & Wolf "Principles of optics, electromagnetic theory of propagation, interference and diffraction of light"). The finesse of the Fabry-Perot in this case is in the range of 2–8, but may be increased by coating the cavity surfaces.

Figure 7:
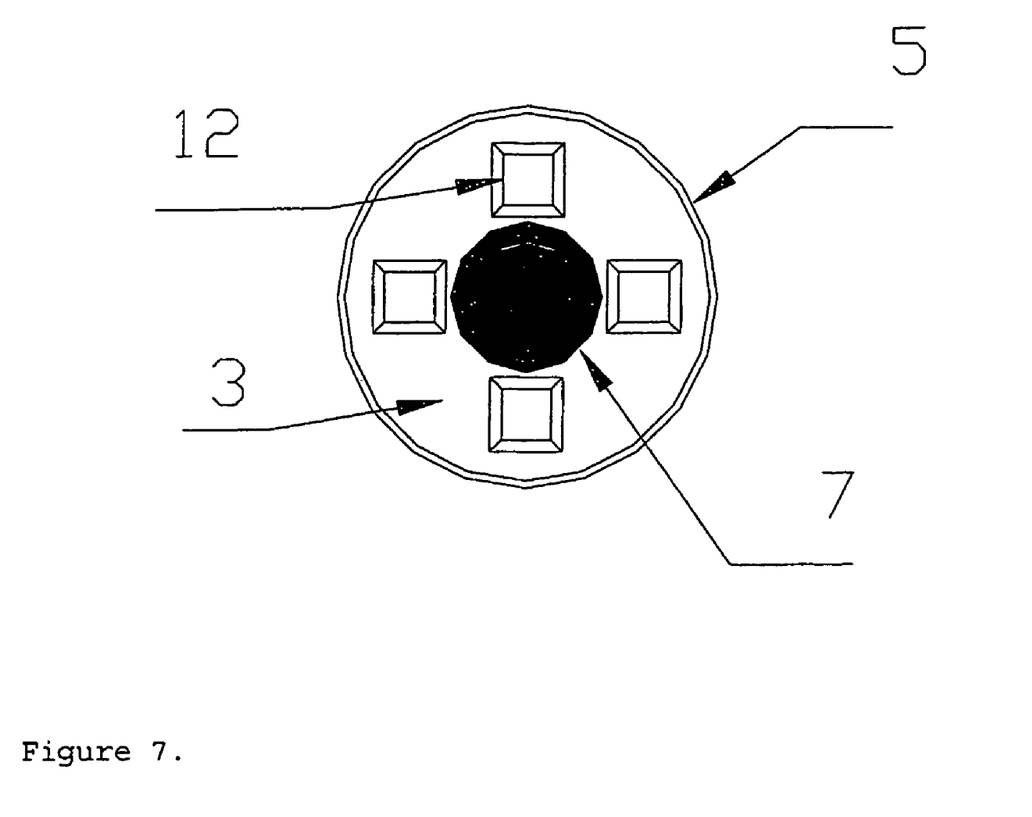
FIG. 7 illustrates detector and four through holes for controlling the squeeze-film effect.

An example of this adapted for use as a microphone is shown in FIG. 7, illustrating an alternative to the sensor element illustrated in FIG. 3. In FIG. 7 the lower part 3 is provided with large through holes 12 to reduce frequency limitations caused by the so-called squeeze film effect.

Figure 8:
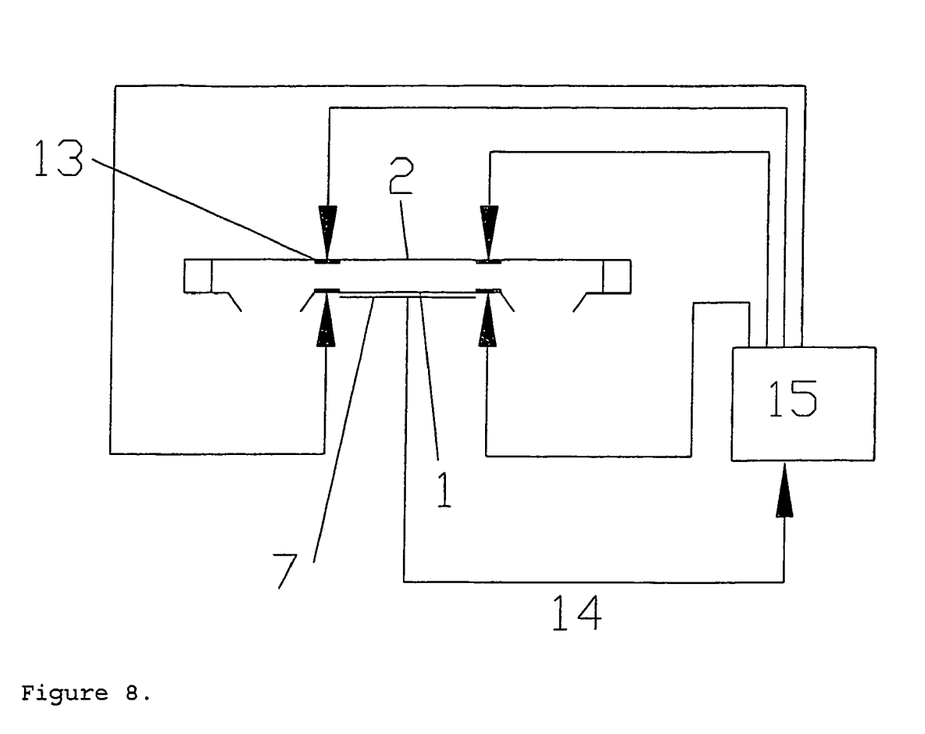
FIG. 8 illustrates an embodiment of the invention using a force feedback control of the position of the surfaces according to the invention.

So far we have paid attention to surface 1 of the Fabry-Perot interferometer, the detector surface. Different embodiments of the membrane are also possible. In one embodiment of the invention the membrane is deflecting with the pressure variations, and the pressure signal is read from the detector. In another embodiment of the invention the membrane and areas beside the detector are supplied with electrodes (FIG. 8). By controlling the voltage with a control unit 15 over these electrodes 13 the membrane is kept motionless by force feedback, using the detector signal 14. This will increase the dynamic range of the sensor. The pressure signal is read from the applied voltage over the cavity. In yet another embodiment the cavity distance is set by a DC voltage over the electrodes, thus defining a working point around which the membrane deflects. Instead of using electrodes as above, the same functionality can be obtained by varying the thickness of the spacer (for example by using a piezo-electric material).

The cavity distance is limited by at least two things: the squeeze-film effect and the coherence length of the light source. The squeeze-film effect damps the membrane vibration above a frequency limit, and thus limits the diameter of surface 1 and the cavity distance. The squeeze film effect may, however, be used as a damping effect avoiding resonance in the system, thus providing a parameter to be considered when making the sensor element.

If surface 1 has diameter 1 mm and the cavity distance is 2 μm, the cut-off frequency is around 10 kHz due to the squeeze-film effect. If a higher cut-off frequency is required the cavity distance must be increased. If we use a LED as light source the cavity distance is limited to around 30 μm, which is the approximate coherence length of a LED. The accuracy of the spacer forming the cavity distance should be better than ±λ/16, if collimated light is used and the cavity distance can not be controlled (by means of for example electrodes or a piezo-electric spacer). This constraint is relaxed if a point source and several concentric ring detectors are used, or if electrodes are used to drag the membrane to an optimal cavity distance. When the membrane deflects due to pressure variations, the cavity will no longer be parallel. This divergence is negligible, though, since the membrane deflection is in the order of $10^{-8}$ to its diameter.

The invention has been described here primarily as related to microphones or pressure sensors. It may however with minor changes be used in other situations such as accelerometers, gyros or similar, in which one surface moves relative to the other. The required flexibility might either be in a membrane, or in springs supporting either the detector or the passive part of the sensor. In the case of an accelerometer or a gyro the movable surface may e.g. be provided with a weight to increase the measurement sensitivity.

The invention claimed is:

1. Optical displacement sensor, comprising two essentially flat surfaces (1, 2) provided on respective element parts (3, 4) being separated by a cavity being defined by a spacer (5), the distance (d) between the surfaces (1, 2) being variable thus providing a displacement sensitive Fabry-Perot interferometer, wherein
    both of said surfaces (1, 2) are at least partially reflective, and said first surface (1) being provided with at least one optical detector (7) and one of said element parts (3, 4) being made of an at least partially transparent material, wherein said optical detector (7) comprises a number of concentric ring shaped detectors symmetrically positioned relative to the optical axis of the Fabry-Perot interferometer,
    the sensor also comprising a light source (6) directed toward said surfaces (1, 2), said light source (6) being sufficiently monochromatic and point shaped to provide interference with the Fabry-Perot interferometer.

2. Optical sensor according to claim 1, wherein the distance is $$d=m\lambda/2\pm\Delta; \ m=0, 1, 2, \ldots$$

where Δ is close to or essentially equal to max(|∂(IT)/∂(d)|) T being the transmitted intensity as defined in equation [1] and d is the cavity distance.

3. Optical sensor according to claim 1, wherein the first surface (1) is provided on a first sensor element part (3) being made from a semiconductor, and at least one optical detector being a p-n junction.

4. Optical sensor according to claim 3, wherein the semiconductor comprises silicon.

5. Optical sensor according to claim 1, wherein the second surface (2) is provided on a second sensor element part (4) being made from SiN (silicon nitride).

6. Optical sensor according to claim 1, said first and second parts (3, 4) and the spacer (5), constitutes a housing, said housing including a leakage channel (10) between the cavity and the environment for slow pressure equilibration between the two.

7. Optical sensor according to claim 1, wherein each said first and second parts (3, 4) are provided with an electrical conductor (13), the conductors (13) being coupled to a control unit (15) for applying a voltage on the conductors 13, the control unit also being coupled to said at least one detector (7) so as to control the distance (d) between the surfaces (1, 2) when a change is detected, the output voltage also being indicative of the changes in the pressure of the environment.

8. Optical sensor according to claim 7, wherein the control unit (15) is adapted to adjust the working distance (d) between the surfaces (1, 2) to a chosen value.

9. Optical sensor according to claim 1, wherein said at least one detector (7) is a partly transparent detector and said first surface (1) being provided on an element part (3) which is made from an at least partially transparent material.

10. Optical sensor according to claim 1, comprising a channel (10) for controlled air throughput between the cavity and the environment.

11. Optical displacement sensor, comprising two essentially flat surfaces (1, 2) provided on respective element parts (3, 4) being separated by a cavity being defined by a spacer (5), the distance (d) between the surfaces (1, 2) being variable thus providing a displacement sensitive Fabry-Perot interferometer, wherein both of said surfaces (1, 2) are at least partially reflective, and said first surface (1) being provided with at least one optical detector (7) and one of said element parts (3, 4) being made of an at least partially transparent material, the sensor also comprising:

a light source (6) directed toward said surfaces (1, 2), said light source (6) being fastened to a rigid frame (9) maintaining a predetermined distance to the Fabry-Perot interferometer and being sufficiently monochromatic and point shaped to provide interference with the Fabry-Perot interferometer, and a collimating lens (8) positioned in the light beam of the light source (6) so as to provide essentially plane wave fronts through the Fabry-Perot interferometer to the detector (7), wherein the detector is a plane detector covering a substantial part of the partially reflective surface (1).

12. Optical displacement sensor element comprising:

two essentially flat surfaces separated by a cavity, wherein both of said surfaces are at least partially reflective;

a spacer defining said cavity, the distance between the surfaces being variable, thus providing a displacement sensitive Fabry-Perot interferometer; and at least one partly transparent optical detector operatively associated with said first surface, said optical detector being provided on an at least partially transparent material.

* * * * *